US009474075B2

United States Patent
Yavuz et al.

(10) Patent No.: US 9,474,075 B2
(45) Date of Patent: Oct. 18, 2016

(54) OPERATION MODE ADAPTATION BASED ON HARDWARE AND CHANNEL CONDITION CONSTRAINTS

(71) Applicant: QUALCOMM Incorporated, San Diego, CA (US)

(72) Inventors: Mehmet Yavuz, San Diego, CA (US); Chirag Sureshbhai Patel, San Diego, CA (US); Tamer Adel Kadous, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/229,642

(22) Filed: Mar. 28, 2014

(65) Prior Publication Data

US 2015/0282154 A1 Oct. 1, 2015

(51) Int. Cl.
*G08C 17/00* (2006.01)
*H04W 72/04* (2009.01)
*H04W 28/02* (2009.01)
*H04B 7/04* (2006.01)
*H04W 52/02* (2009.01)
*H04W 88/06* (2009.01)

(52) U.S. Cl.
CPC ......... *H04W 72/048* (2013.01); *H04B 7/0426* (2013.01); *H04W 28/0221* (2013.01); *H04W 52/028* (2013.01); *H04W 52/0238* (2013.01); *H04W 52/0245* (2013.01); *H04W 52/0277* (2013.01); *H04W 88/06* (2013.01)

(58) Field of Classification Search
CPC .................................................... G08C 17/00
See application file for complete search history.

(56) References Cited

U.S. PATENT DOCUMENTS 8,428,529 B2  4/2013  Dakshinamurthy et al.
8,515,496 B2  8/2013  Cheng et al.
(Continued)

FOREIGN PATENT DOCUMENTS

EP  1838011 A1  9/2007
EP  2490347 A1  8/2012
(Continued)

OTHER PUBLICATIONS

U.S. Patent Application Docket No. 123548 entitled "Methods and Apparatus for Reporting Channel Quality Indicator (CQI)" and drawings filed Mar. 14, 2013.
(Continued)

*Primary Examiner* — Chi H Pham
*Assistant Examiner* — Raul Rivas
(74) *Attorney, Agent, or Firm* — Arent Fox LLP (57) ABSTRACT

A system and method for operation mode adaptation is operable by a network entity that determines channel conditions between the network entity and a second network entity. The network entity determines its hardware constraints and power consumption requirements. The network entity balances data throughput with power consumption for the network entity by selecting a hardware allocation, based at least in part on the channel conditions, the hardware constraints, and the power consumption requirements. In some implementations, the network entity balances data throughput with power consumption for the network entity by selecting an operation mode, based at least in part on the channel conditions, the hardware constraints, and the power consumption requirements.

27 Claims, 7 Drawing Sheets

(56) References Cited

U.S. PATENT DOCUMENTS

| | | |
|---|---|---|
| 2008/0151798 A1 | 6/2008 | Camp |
| 2008/0159210 A1* | 7/2008 | Zaks ............... H04W 72/06 |
| | | 370/329 |
| 2009/0067355 A1 | 3/2009 | Haartsen et al. |
| 2009/0247091 A1 | 10/2009 | Jalloul et al. |
| 2009/0257387 A1 | 10/2009 | Gholmieh et al. |
| 2010/0098184 A1 | 4/2010 | Ryoo et al. |
| 2010/0172254 A1 | 7/2010 | Sachs |
| 2010/0216474 A1 | 8/2010 | Park et al. |
| 2010/0222058 A1 | 9/2010 | Pudney et al. |
| 2010/0260147 A1 | 10/2010 | Xing et al. |
| 2010/0284449 A1 | 11/2010 | De et al. |
| 2010/0284476 A1* | 11/2010 | Potkonjak ............ H04L 1/1858 |
| | | 375/260 |
| 2011/0019559 A1* | 1/2011 | Gore .................... H04L 1/0029 |
| | | 370/252 |
| 2011/0128862 A1 | 6/2011 | Kallin et al. |
| 2011/0243007 A1 | 10/2011 | Xiao |
| 2012/0113945 A1 | 5/2012 | Moon et al. |
| 2012/0142296 A1 | 6/2012 | Cotterill et al. |
| 2012/0276909 A1 | 11/2012 | Xiao et al. |
| 2013/0017797 A1 | 1/2013 | Ramasamy et al. |
| 2013/0033996 A1 | 2/2013 | Song et al. |
| 2013/0045744 A1 | 2/2013 | Dimpflmaier et al. |
| 2013/0051261 A1 | 2/2013 | Kazmi et al. |
| 2013/0077507 A1 | 3/2013 | Yu et al. |
| 2013/0128778 A1 | 5/2013 | Bennett |
| 2013/0143494 A1 | 6/2013 | Chen et al. |
| 2013/0201834 A1 | 8/2013 | Klingenbrunn et al. |
| 2013/0223265 A1 | 8/2013 | Yomo et al. |
| 2013/0225094 A1 | 8/2013 | Mujtaba et al. |
| 2013/0225223 A1 | 8/2013 | Nukala et al. |
| 2013/0329665 A1 | 12/2013 | Kadous et al. |
| 2014/0219326 A1* | 8/2014 | Ko ..................... H04B 7/0417 |
| | | 375/228 |
| 2015/0036656 A1* | 2/2015 | McCarthy ............ H04B 7/0871 |
| | | 370/331 |
| 2015/0133185 A1* | 5/2015 | Chen ................ H04W 72/1215 |
| | | 455/552.1 |
| 2015/0282077 A1 | 10/2015 | Yavuz |

FOREIGN PATENT DOCUMENTS

| | | |
|---|---|---|
| WO | 0230089 A2 | 4/2002 |
| WO | 2010105210 A2 | 9/2010 |
| WO | 2013005105 A2 | 1/2013 |
| WO | 2013140243 A1 | 9/2013 |

OTHER PUBLICATIONS

International Search Report and Written Opinion—PCT/US2015/022836—ISA/EPO—Aug. 24, 2015.

* cited by examiner

```
┌─────────────────────────────────────────────┐ ─ 610
│ DETERMINING CHANNEL CONDITIONS FOR A COMMUNICATION │
│ CHANNEL BETWEEN THE NETWORK ENTITY AND A SECOND │
│               NETWORK ENTITY                │
└─────────────────────────────────────────────┘
                     │
                     ▼
┌─────────────────────────────────────────────┐ ─ 620
│ DETERMINING HARDWARE CONSTRAINTS FOR THE NETWORK │
│                   ENTITY                    │
└─────────────────────────────────────────────┘
                     │
                     ▼
┌─────────────────────────────────────────────┐ ─ 630
│ DETERMINING POWER CONSUMPTION REQUIREMENTS FOR │
│             THE NETWORK ENTITY              │
└─────────────────────────────────────────────┘
                     │
                     ▼
┌─────────────────────────────────────────────┐ ─ 640
│ BALANCING DATA THROUGHPUT WITH POWER CONSUMPTION │
│ FOR THE NETWORK ENTITY BY SELECTING AN OPERATION │
│ MODE, BASED AT LEAST IN PART ON THE CHANNEL │
│ CONDITIONS, THE HARDWARE CONSTRAINTS, AND THE POWER │
│            CONSUMPTION REQUIREMENTS         │
└─────────────────────────────────────────────┘
```

OPERATION MODE ADAPTATION BASED ON HARDWARE AND CHANNEL CONDITION CONSTRAINTS

BACKGROUND

This application is directed to wireless communications systems, and more particularly to methods and apparatuses for operation mode adaptation in wireless communications systems.

A wireless network may be deployed over a defined geographical area to provide various types of services (e.g., voice, data, multimedia services, etc.) to users within that geographical area. The wireless communication network may include a number of base stations that can support communication for a number of user equipments (UEs). A UE may communicate with a base station via a downlink and an uplink.

The 3rd Generation Partnership Project (3GPP) Long Term Evolution (LTE) advanced cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs.

Carrier aggregation (CA) or channel aggregation is used in LTE-Advanced in order to increase the bandwidth, and thereby increase data rates. Carrier aggregation enables multiple LTE carriers to be used together to provide the high data rates required for LTE Advanced. Each aggregated carrier is referred to as a component carrier (CC). For example, the component carrier can have a bandwidth of 1.4, 3, 5, 10, 15, or 20 MHz. In Frequency Division Duplexing (FDD), the number of aggregated carriers can be different in downlink (DL) and uplink (UL). The individual component carriers can also be of different bandwidths. In Time Division Duplexing (TDD), the number of CCs and the bandwidth of each CC are the same for DL and UL.

Multiple-input and multiple-output (MIMO) can also be used to improve communication performance. MIMO multiple antennas can be located at both the transmitter (Tx) and receiver (Rx) end. MIMO may spread a total transmit power over multiple antennas to achieve a power gain that improves spectral efficiency (data rate per bandwidth used). MIMO may also increase signal-to-interference ratio which improves communication reliability.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In accordance with one or more aspects of the implementations described herein, there is provided a system and method for operation mode adaptation based on hardware and channel condition constraints. In one implementation, a network entity may determine channel conditions between the network entity and a second network entity. The network entity may determine its hardware constraints and power consumption requirements. The network entity may balance data throughput with power consumption for the network entity by selecting a hardware allocation, based at least in part on the channel conditions, the hardware constraints, and the power consumption requirements, wherein selecting the operation mode may include (1) selecting one of a single-input single-output (SISO) mode, a single-input multiple-output (SIMO) mode, or a multiple-input multiple-output (MIMO) mode, and (2) selecting one of a carrier aggregation (CA) enabled mode or a CA disabled mode.

In some implementations, the network entity may balance data throughput with power consumption for the network entity by selecting an operation mode, based at least in part on the channel conditions, the hardware constraints, and the power consumption requirements.

BRIEF DESCRIPTION OF THE DRAWINGS

These and other sample aspects of the disclosure will be described in the detailed description and the appended claims that follow, and in the accompanying drawings, wherein:

DETAILED DESCRIPTION

Techniques for operation mode adaptation are described herein. The subject disclosure provides a technique for improving service to a mobile device (or UE). For communications between a base station and a UE, the technique balances data throughput with power consumption by selecting a hardware allocation or an operation mode. The balancing may be based on parameter(s) such as, for example, hardware resources available (e.g., number of transmit antenna chains for the UE), channel conditions between the base station and the UE, data throughput requirements, power consumption constraints, any other suitable parameters, or any combination thereof.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The techniques may be used for various wireless communication networks such as wireless wide area networks (WWANs) and wireless local area networks (WLANs). The terms "network" and "system" are often used interchangeably. The WWANs may be code division multiple access (CDMA), time division multiple access (TDMA), frequency division multiple access (FDMA), orthogonal frequency-division multiple access (OFDMA), single carrier frequency division multiple access (SC-FDMA) and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

As used herein, an access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macrocell, a macro node, a Home eNB (HeNB), a femtocell, a femto node, a pico node, or some other similar terminology. An access point may be, or may include, a macrocell or microcell. Microcells (e.g., picocells, femtocells, home nodeBs, small cells, and small cell base stations) are characterized by having generally much lower transmit power than macrocells, and may often be deployed without central planning. In contrast, macrocells are typically installed at fixed locations as part of a planned network infrastructure, and cover relatively large areas.

As used herein, a downlink (or forward link) refers to a communication link from an access point to a UE, and an uplink (or reverse link) refers to a communication link from a UE to an access point.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below.

Figure 1:
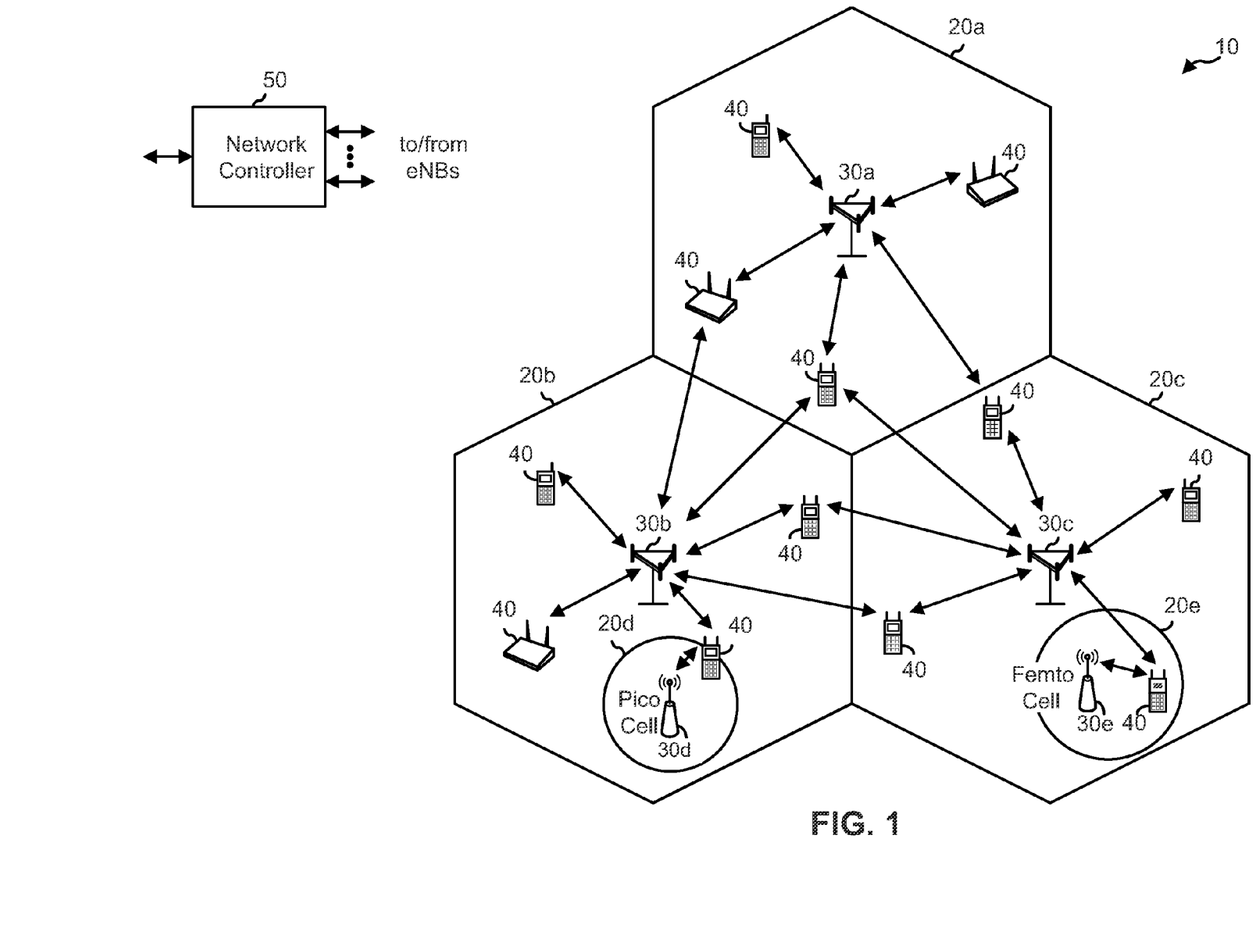
FIG. 1 illustrates an example wireless communication network.

FIG. 1 illustrates an example wireless communication network 10, which may be an LTE network or some other wireless network. Wireless network 10 may include a number of evolved Node Bs (eNBs) 30 and other network entities. An eNB may be an entity that communicates with mobile entities and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macrocell, a picocell, a femtocell, and/or other types of cell. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG)). In the example shown in FIG. 1, eNBs 30a, 30b, and 30c may be macro eNBs for macrocell groups 20a, 20b, and 20c, respectively. Each of the cell groups 20a, 20b, and 20c may include a plurality (e.g., three) of cells or sectors. An eNB 30d may be a pico eNB for a picocell 20d. An eNB 30e may be a femto eNB, femtocell base station, or femto access point (FAP) for a femtocell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may be a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink (DL) and uplink (UL). A carrier may refer to a range of frequencies used for communication and may be associated with certain characteristics. Operation on multiple carriers may also be referred to as multi-carrier operation or carrier aggregation (CA). A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the DL carrier.

Carrier aggregation allows expansion of effective bandwidth delivered to a user terminal through concurrent use of radio resources across multiple carriers. When carriers are aggregated, each carrier is referred to as a component carrier. Multiple component carriers are aggregated to form a larger overall transmission bandwidth. Two or more component carriers can be aggregated to support wider transmission bandwidths.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), or MIMO. For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
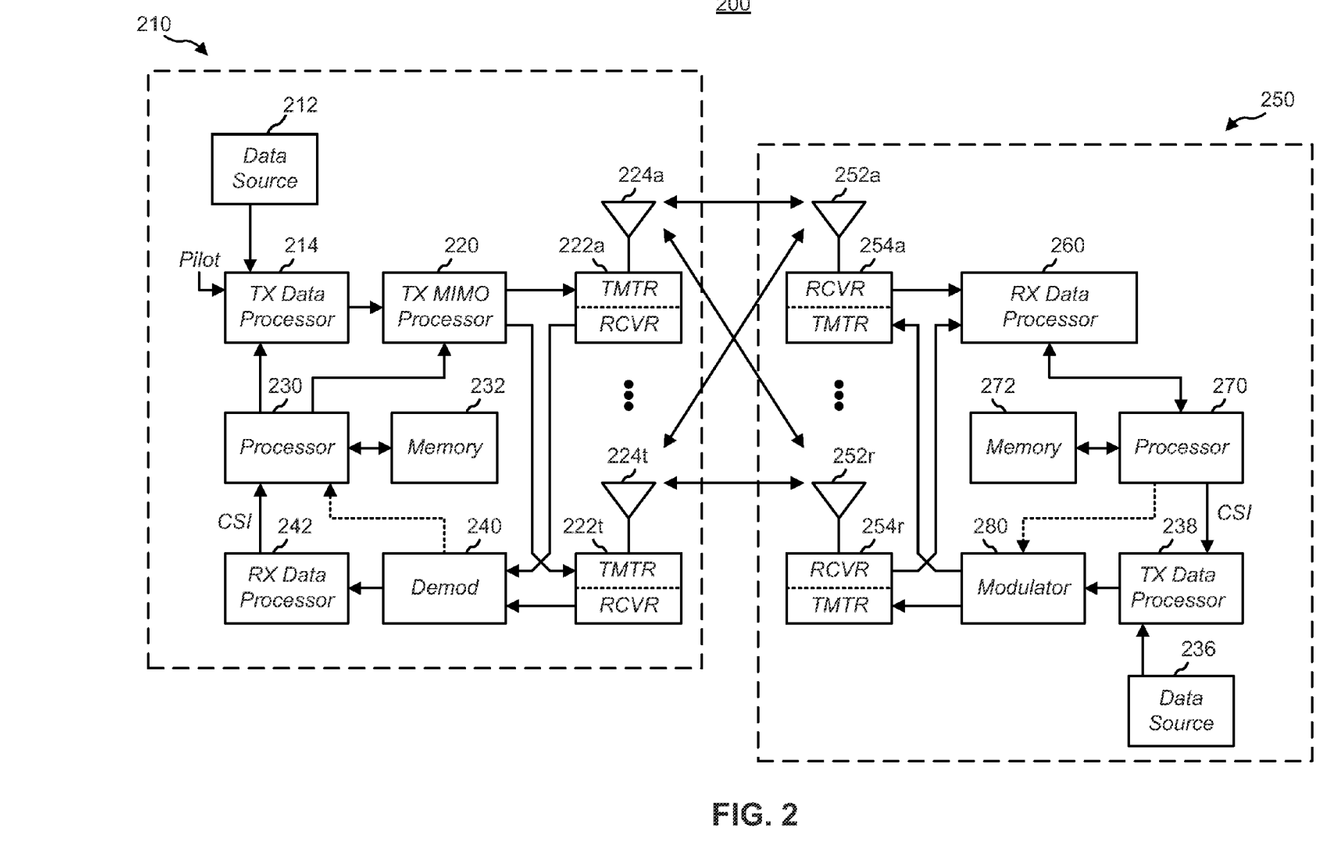
FIG. 2 illustrates a block diagram of example communication system components.

FIG. 2 illustrates a block diagram 200 including a transmitter system 210 (also known as the access point, base station, or eNB) and a receiver system 250 (also known as access terminal, mobile device, or UE) in an LTE MIMO system 200. In the present disclosure, the transmitter system 210 may correspond to a WS-enabled eNB or the like, whereas the receiver system 250 may correspond to a WS-enabled UE or the like.

At the transmitter system 210, traffic data for a number of data streams is provided from a data source 212 to a transmit data processor 214. Each data stream is transmitted over a respective transmit antenna. Tx data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a Tx MIMO processor 220, which may further process the modulation symbols (e.g., for OFDM). Tx MIMO processor 220 then provides $N_T$ modulation symbol streams to $N_T$ transmitters (TMTR) 222a through 222t. In certain implementations, Tx MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and up-converts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An Rx data processor 260 then receives and processes the $N_R$ received symbol streams from $N_R$ receivers 254 based on a particular receiver processing technique to provide $N_T$ "detected" symbol streams. The Rx data processor 260 then demodulates, de-interleaves, and decodes each detected symbol stream to recover the traffic data for the data stream. The processing by Rx data processor 260 is complementary to that performed by Tx MIMO processor 220 and Tx data processor 214 at transmitter system 210.

A processor 270 periodically determines which pre-coding matrix to use (discussed below). Processor 270 formulates a reverse link message comprising a matrix index portion and a rank value portion. The reverse link message may comprise various types of information regarding the communication link and/or the received data stream. The reverse link message is then processed by a Tx data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a Rx data processor 242 to extract the reserve link message transmitted by the receiver system 250. Processor 230 then determines which pre-coding matrix to use for determining the beam-forming weights then processes the extracted message.

Figure 3:
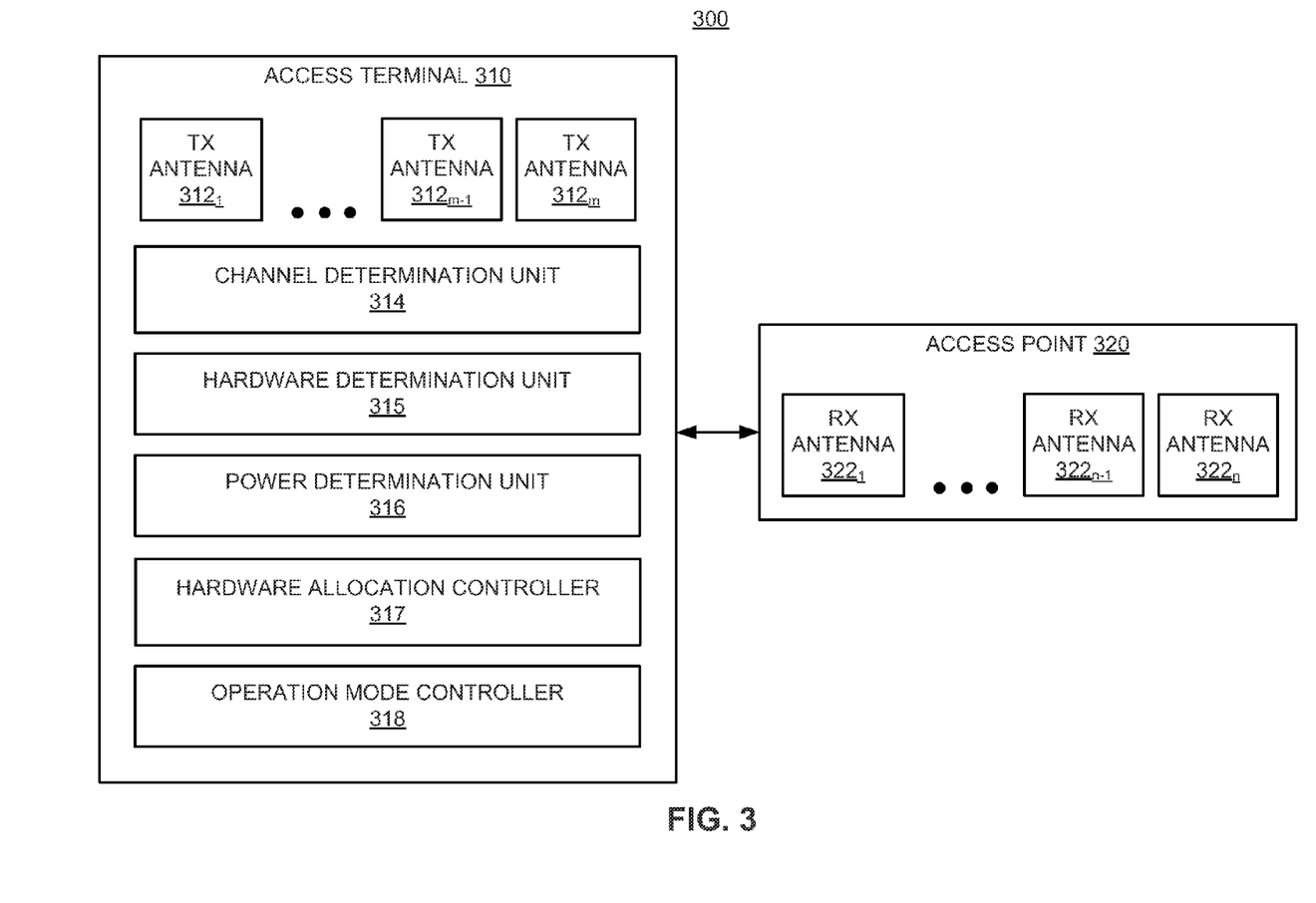
FIG. 3 illustrates a block diagram of a communication system for operation mode adaptation.

FIG. 3 illustrates an example wireless communication scenario between an access terminal 310 and an access point 320. For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. It should be further appreciated that the teachings herein may be applicable to communication scenarios between a plurality of access points or between a plurality of access terminals. It should also be appreciated that system 300, access terminal 310, and access point 320 can include additional components not shown in FIG. 3. For example, components included in the access terminal 310 may be included in the access point 320 or another network device. It should be still further appreciated that operations performed by the access terminal 310 may be performed by the access point 320 or other such network device.

The access point 320 in the system 100 may provide access to one or more services (e.g., network connectivity) for one or more wireless terminals (e.g., access terminal, UE, mobile entity, mobile device) 310. The access point 320 may communicate with one or more network entities (not shown) to facilitate wide area network connectivity. Such network entities may take various forms such as, for example, one or more radio and/or core network entities.

In various implementations, the network entities may be responsible for or otherwise be involved with handling: network management (e.g., via an operation, administration, management, and provisioning entity), call control, session management, mobility management, gateway functions, interworking functions, or some other suitable network functionality. In a related aspect, mobility management may relate to or involve: keeping track of the current location of access terminals through the use of tracking areas, location areas, routing areas, or some other suitable technique; controlling paging for access terminals; and providing access control for access terminals. Also, two of more of these network entities may be co-located and/or two or more of such network entities may be distributed throughout a network.

The access terminal 310 may include one or more transmit (Tx) antenna chain (e.g., Tx antenna chains $312_1$-$312_m$).

The access point 320 may include at least one receive (Rx) antenna chain (e.g., Rx antenna chains $322_1$-$322_n$). In an example aspect, the access terminal 310 may include two Tx antenna chains and the access point 320 may include two Rx antenna chains. Uplink communication from the access terminal 310 to the access point 320 may use at least one of 2×2 MIMO, 1×2 SIMO, or 1×1 SISO. At least two Tx antenna chains for the access terminal 310 and at least two Rx antenna chains for the access point 320 may be needed for 2×2 MIMO uplink. Persons skilled in the art will appreciate that although access terminal 310 is shown to include only Tx antenna chains and access point 320 is shown to include only Rx antenna chains in FIG. 3, access terminal 310 and access point 320 may include other types of antenna chains (e.g., for purposes of downlink communications). For example, access terminal 310 may include one or more Rx antenna chains and access point 320 may include one or more Tx antenna chains (not shown in FIG. 3).

In an example implementation, the access terminal 310 may include a channel determination unit 314. The channel determination unit 314 may determine channel conditions between the access terminal 310 and the access point 320. In a related aspect, the channel determination unit 314 may determine a channel capacity for a channel between the access terminal 310 and the access point 320. For example, the channel determination unit 314 may assign a particular ranking to a communications channel based on a number of simultaneous data streams that can be supported by the communications channel. For example, a communications channel with capacity for a single data stream may be considered a rank 1 channel, while a channel with capacity for two data streams may be considered a rank 2 channel, and so forth. In some embodiments, a rank 1 channel may be determined to not support a 2×2 MIMO mode, but allow a 1×1 SISO mode.

In an example implementation, the access terminal 310 may include a hardware determination unit 315. The hardware determination unit 315 may determine hardware constraints for the access terminal 310. In a related aspect, the hardware determination unit 315 may determine a number of Tx antenna chains for the access terminal 310. For example, the hardware determination unit 315 may determine that there are two Tx antenna chains 312. The hardware determination unit 315 may determine the quantity of Tx antenna chains using any suitable approach. For example, the hardware determination unit 315 can receive or obtain information associated with the quantity of Tx antenna chains available to the access terminal 310 from the access terminal 310, a network controller, or another such source.

In another related aspect, the hardware determination unit 315 may determine Tx antenna chain power 312 amplifier capabilities. To illustrate for example, the access terminal 310 may include a plurality of Tx antenna chains. One or more of the plurality of Tx antenna chains may connect directly to antenna terminals. Other Tx antenna chains may connect to the antenna terminals via power amplifiers. The hardware determination unit 315 may determine which Tx antenna chains are directly connected and which Tx antenna chains are connected via power amplifiers, to the antenna terminals. Based on this determination, the hardware determination unit 315 can select which type of Tx antenna chains to use for a given purpose.

In an example implementation, the access terminal 310 may include a power determination component 316. The power determination component 316 may determine power consumption requirements for the access terminal 310. In a related aspect, the power determination component 316 may determine a current battery level for the access terminal 310.

In an example implementation, the access terminal 310 may include a hardware allocation controller 317. The hardware allocation controller 317 may balance data throughput with power consumption based at least in part on the channel conditions, the hardware constraints, and the power consumption requirements. In a related aspect, the hardware allocation controller 317 may allocate power levels for the Tx antenna chains 312 to balance data throughput with power consumption. For example, the hardware allocation controller 317 may allocate power levels for the Tx antenna chains 312 that minimizes power consumption at the expense of lower data throughput.

In another related aspect, the hardware allocation controller 317 may disable one or more Tx antenna chain 312 to balance data throughput with power consumption. For example, the hardware allocation controller 317 may disable one or more Tx antenna 312 in response to the number of Tx antenna chains exceeding the rank of the channel. As another example, the hardware allocation controller 317 may disable one or more Tx antenna chains 312 to minimize or lower power consumption in response to determining that the current battery level is low. In a related example, the hardware allocation controller 317 may periodically re-enable a disabled Tx antenna chain 312 for channel estimation or switching to a higher rank.

In a related aspect, the hardware allocation controller 317 may allocate unequal power levels to a plurality of Tx antenna chains 312, in response to determining that the plurality of Tx antenna chains 312 have differing power amplifier capabilities. If it is determined that higher power amplifier capable antenna chains are used together with lower power amplifier capable antenna chains for MIMO, power may be conserved by decreasing power to the higher power amplifier capable antenna chains.

In yet another related aspect, the hardware allocation controller 317 may reallocate at least one Tx antenna chain 312 from Wi-Fi use to LTE use or reallocate at least one Tx antenna chain 312 from LTE use to Wi-Fi use. In some instances, the hardware allocation controller 317 can use information obtained from the hardware determination unit 315. For example, once the hardware determination unit 315 has selected which type of Tx antenna chains to use, the hardware allocation controller 317 can allocate at least one Tx antenna chain 312 to either Wi-Fi use or LTE use.

In an example implementation, the access terminal 310 may include an operation mode controller 318. In a related aspect, the operation mode controller 318 may select one of a SISO mode, a SIMO mode, or a MIMO mode.

In a first example, the operation mode controller 318 may select the SISO mode and the CA enabled mode, in response to determining the channel capacity to be rank 1.

In a second example, the operation mode controller 318 may select the MIMO mode in response to determining the channel capacity to be greater than rank 1.

In third example aspect, the operation mode controller 318 may select the operation mode based on determining a number of receive antenna chains for the second network entity.

In a fourth example, the operation mode controller may select one of the SISO mode, the SIMO mode, or the MIMO mode based on determining a number of receive antenna chains for the second network entity.

For instance, if it is determined that the access terminal 310 includes two Tx antenna chains 312, the access point 320 includes two Rx antenna chains 322, and the communications channel is rank 1, then the operation mode controller 318 may select a 1×1 SISO mode. In this example, the 1×1 SISO mode is selected instead of a 2×2 MIMO mode because a rank 1 channel may not offer benefits over the 1×1 SISO mode. The 2×2 MIMO mode may use two Tx antenna chains 312, whereas the 1×1 SISO mode may use only one Tx antenna chain 312. The MIMO mode may therefore use unnecessary power as compared to SISO. In this example, since SISO may use only one of two Tx antenna chains, the hardware allocation controller 317 may also disable one Tx antenna chain 312 to reduce power consumption.

To illustrate further, if it is determined that the access terminal 310 includes two Tx antenna chains 312, the access point 320 includes two Rx antenna chains 322, and the communications channel is rank 2, the operation mode controller 318 may determine to communicate with the access point 320 using a 2×2 MIMO mode based on the quantity of available Tx antenna chains available for the access terminal 310 and the channel capacity being rank 2. In this example, the operation mode controller 318 may determine not to disable a Tx antenna 312.

As yet another example, if it is determined that the access terminal 310 includes four Tx antenna chains 312, the access point 320 includes four Rx antenna chains 322, and the communications channel is rank 2, the operation mode controller 318 may select a 2×2 MIMO mode. In this example, in order to conserve power, the hardware allocation controller 317 may determine to disable two Tx antenna chains that are not used.

In a related aspect, the operation mode controller 318 may select one of a CA enabled mode or a CA disabled mode. To illustrate, if it is determined that the access terminal 310 includes two Tx antenna chains 312 and the access point 320 includes two Rx antenna chains 322 and the communications channel is rank 1, the operation mode controller 318 may select the CA enabled mode by using 1×1 SISO on two carriers. In this example, the hardware allocation controller 317 may determine not to disable a Tx transmit antenna, because although the number of Tx antenna chains exceeds the channel capacity, the CA mode uses the two Tx antenna chains 312 for two carriers.

Figure 4:
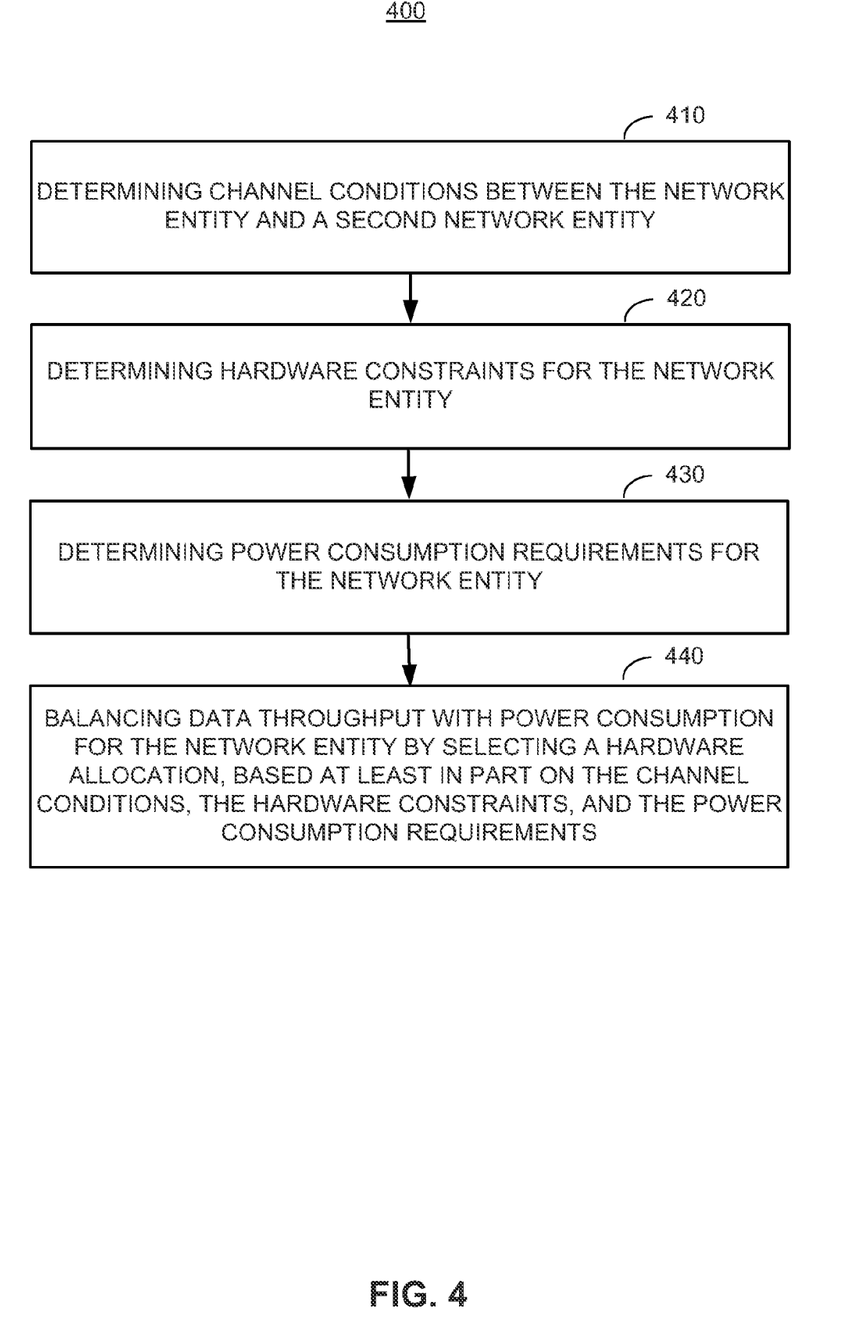
FIG. 4 illustrates an example methodology for operation mode adaptation.

In accordance with one or more aspects of the implementations described herein, with reference to FIG. 4, there is shown a methodology 400 for operation mode adaptation. The method 400, operable by a network entity or component(s) thereof, may involve, at 410 determining channel conditions between the network entity and a second network entity. In an example implementation, the network entity may be the access terminal 110 communicating with the second network entity (e.g, the access point 120, as shown in FIG. 3). In another example implementation, the network entity may be an access point communicating with the second network entity (e.g., an access terminal or other such network entity). In a related aspect, the channel determination unit 314 may determine the channel conditions, as shown in FIG. 3.

The method 400 may involve, at 420, determining hardware constraints for the network entity. In an example implementation, the hardware determination unit 315 may determine the hardware constraints, as shown in FIG. 3.

The method 400 may optionally involve, at 430, determining power consumption requirements for the network entity. In an example implementation, the power determination unit 316 may determine the power consumption requirements, as shown in FIG. 3.

The method 400 may optionally involve, at 440, balancing data throughput with power consumption for the network entity by selecting a hardware allocation, based at least in part on the channel conditions, the hardware constraints, and the power consumption requirements. In an example implementation, the hardware allocation controller 317 may select the hardware allocation, as shown in FIG. 3.

Figure 5:
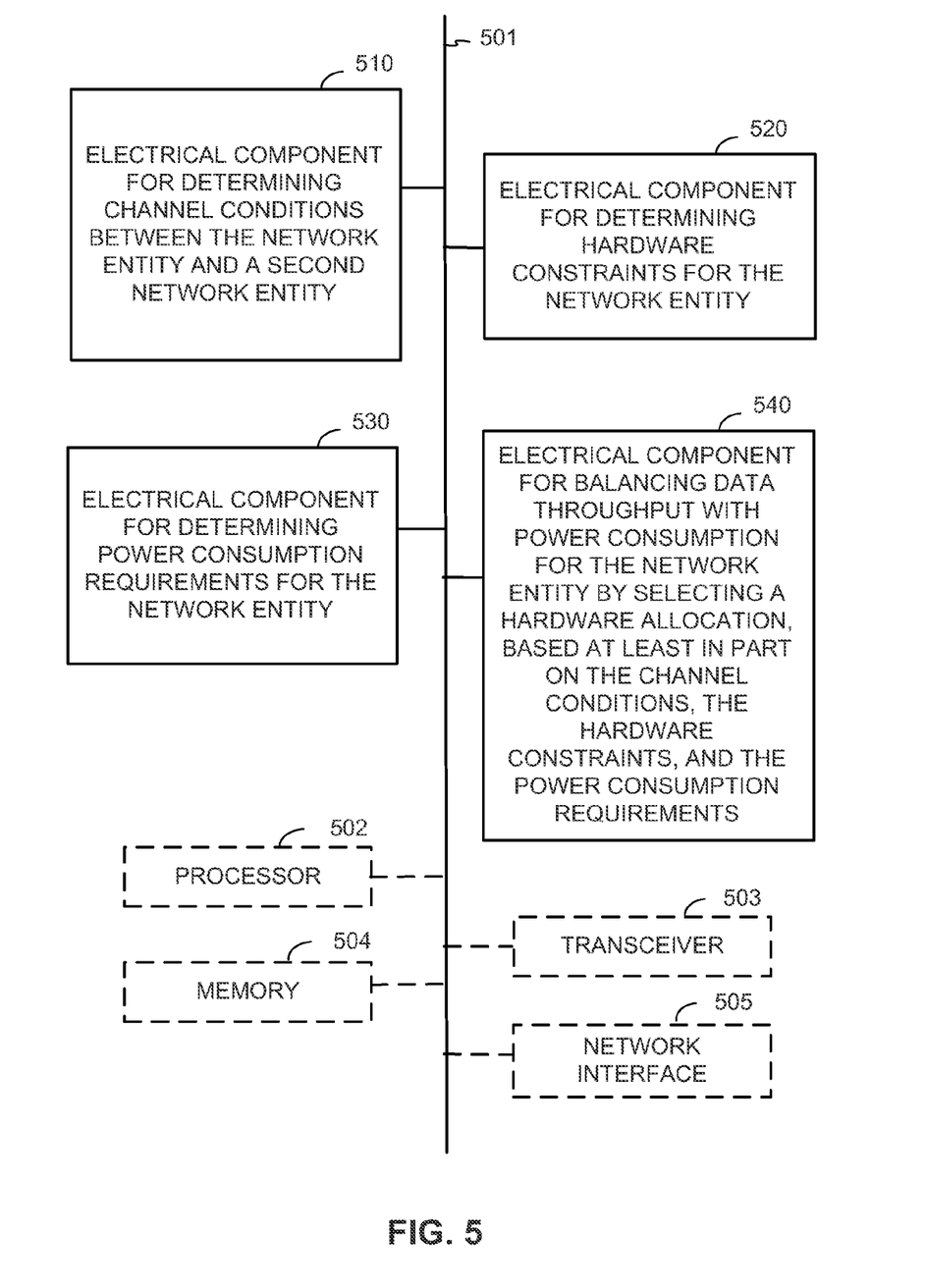
FIG. 5 illustrates an example apparatus for operation mode adaptation in accordance with the methodology of FIG. 4.

In accordance with one or more aspects of the implementations described herein, FIG. 5 illustrates an example apparatus for operation mode adaptation in accordance with the methodology of FIG. 4. The exemplary apparatus 500 may be configured as a computing device or as a processor or similar device/component for use within. In one example, the apparatus 500 may include functional blocks that can represent functions implemented by a processor, software, or combination thereof (e.g., firmware). In another example, the apparatus 300 may be a system on a chip (SoC) or similar integrated circuit (IC).

In one implementation, apparatus 500 may include an electrical component or module 510 for determining channel conditions between the network entity and a second network entity.

The apparatus 500 may include an electrical component 520 for determining hardware constraints for the network entity.

The apparatus 500 may optionally include an electrical component 530 for determining power consumption requirements for the network entity.

The apparatus 500 may optionally include an electrical component 540 for balancing data throughput with power consumption for the network entity by selecting a hardware allocation, based at least in part on the channel conditions, the hardware constraints, and the power consumption requirements.

In further related aspects, the apparatus 500 may optionally include a processor component 502. The processor 502 may be in operative communication with the components 510-540 via a bus 501 or similar communication coupling. The processor 502 may effect initiation and scheduling of the processes or functions performed by electrical components 510-540.

In yet further related aspects, the apparatus 500 may include a radio transceiver component 503. A standalone receiver and/or standalone transmitter may be used in lieu of or in conjunction with the transceiver 503. The apparatus 500 may also include a network interface 505 for connecting to one or more other communication devices or the like. The apparatus 500 may optionally include a component for storing information, such as, for example, a memory device/component 504. The computer readable medium or the memory component 504 may be operatively coupled to the other components of the apparatus 500 via the bus 501 or the like. The memory component 504 may be adapted to store computer readable instructions and data for affecting the processes and behavior of the components 510-540, and subcomponents thereof, or the processor 502, or the methods disclosed herein. The memory component 504 may retain instructions for executing functions associated with the components 510-540. While shown as being external to the memory 504, it is to be understood that the components 510-540 can exist within the memory 504. It is further noted that the components in FIG. 5 may comprise processors, electronic devices, hardware devices, electronic sub-components, logical circuits, memories, software codes, firmware codes, etc., or any combination thereof.

Figure 6:
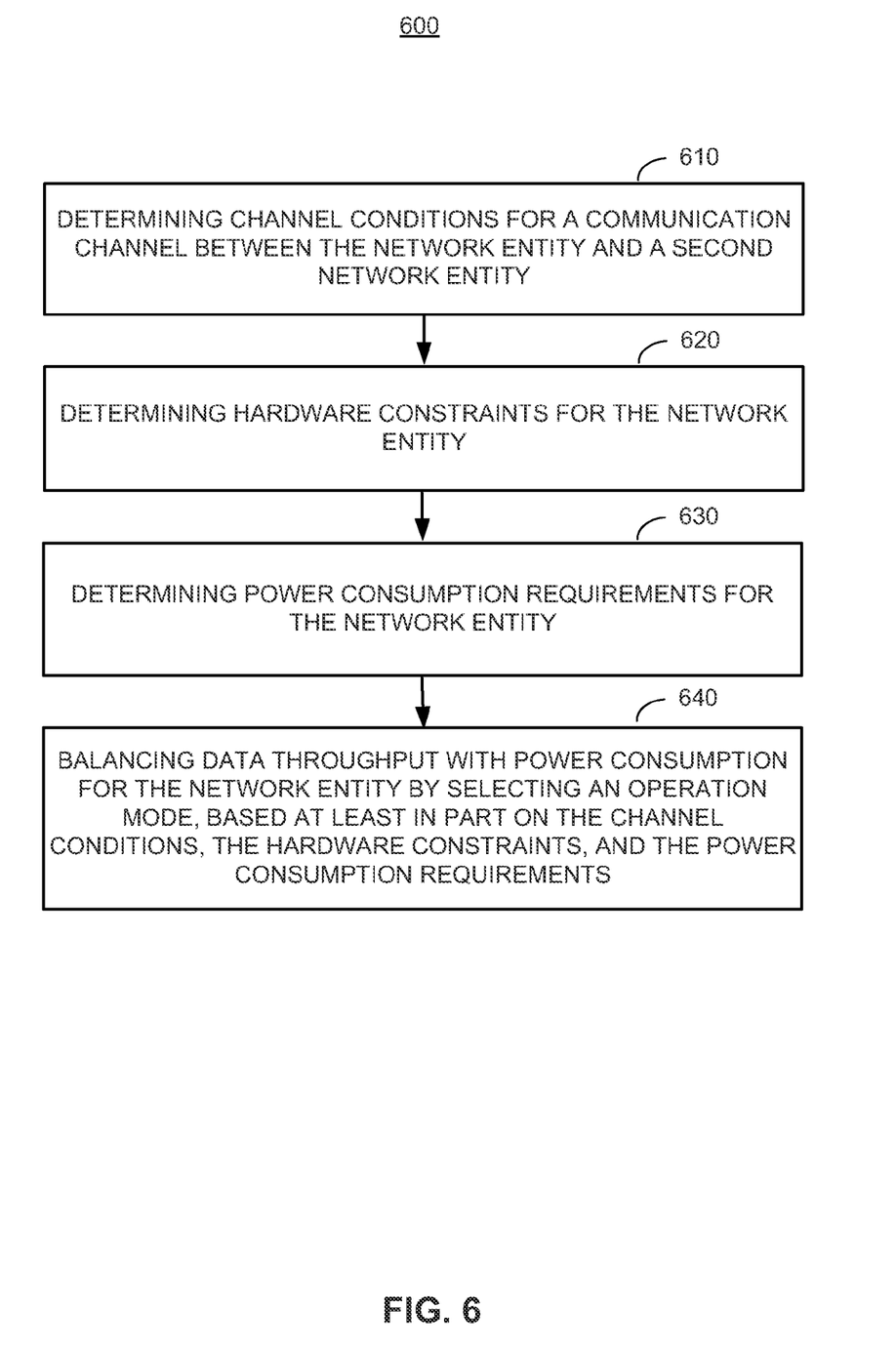
FIG. 6 illustrates a second example methodology for operation mode adaptation.

In accordance with one or more aspects of the implementations described herein, with reference to FIG. 6, there is shown a methodology 600 for operation mode adaptation. The method 600, operable by a network entity or component(s) thereof, may involve, at 610 determining channel conditions between the network entity and a second network entity. In an example implementation, the network entity may be the access terminal 110 communicating with the second network entity (e.g, the access point 120, as shown in FIG. 3). In another example implementation, the network entity may be an access point communicating with the second network entity (e.g., an access terminal or other such network entity). In a related aspect, the channel determination unit 314 may determine the channel conditions, as shown in FIG. 3.

The method 600 may involve, at 620, determining hardware constraints for the network entity. In an example implementation, the hardware determination unit 315 may determine the hardware constraints, as shown in FIG. 3.

The method 600 may optionally involve, at 630, determining power consumption requirements for the network entity. In an example implementation, the power determination unit 316 may determine the power consumption requirements, as shown in FIG. 3.

The method 600 may optionally involve, at 640, balancing data throughput with power consumption for the network entity by selecting an operation mode, based at least in part on the channel conditions, the hardware constraints, and the power consumption requirements. In an example implementation, the operation mode controller 616 may select one of a SISO mode, a SIMO mode, or a MIMO mode, as shown in FIG. 3.

Figure 7:
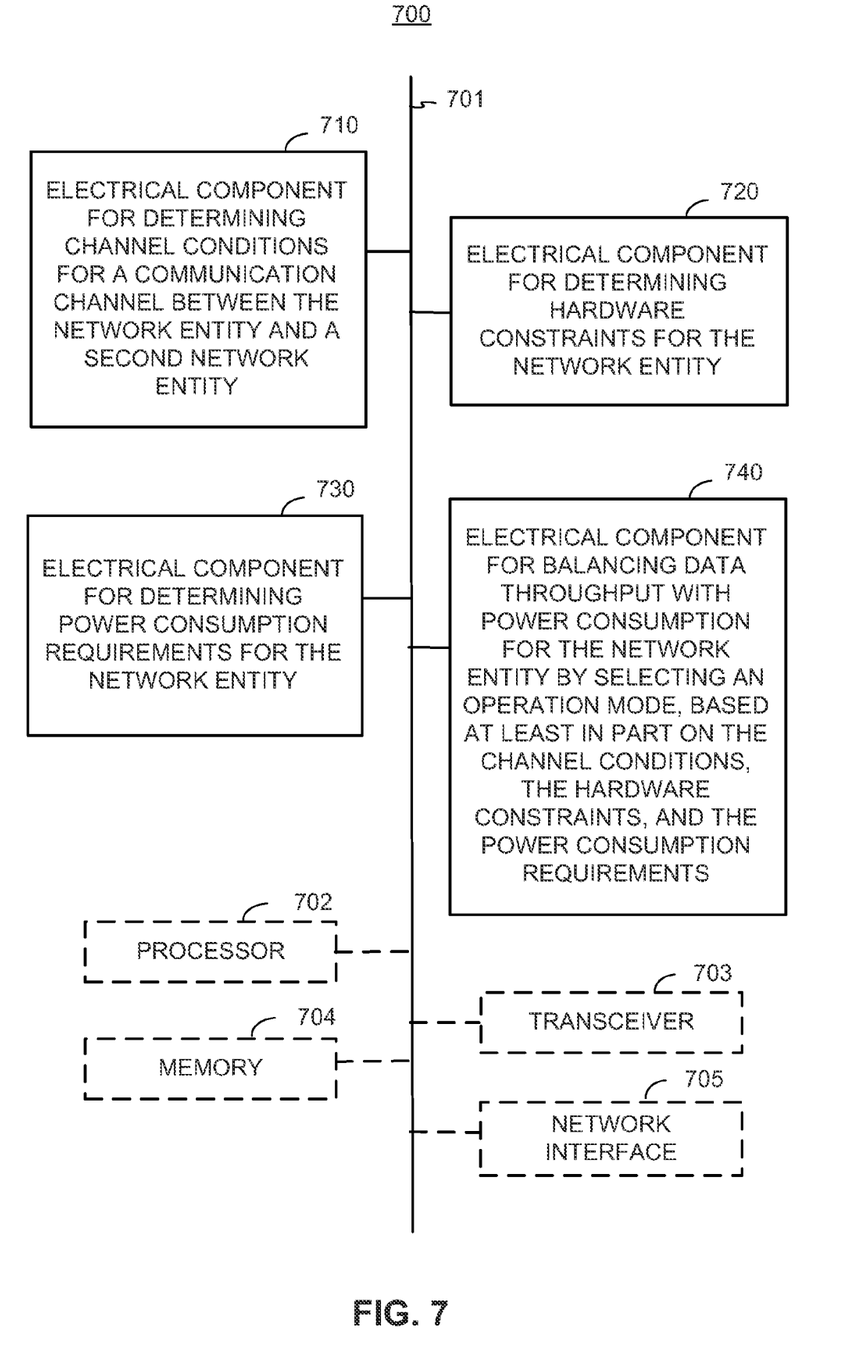
FIG. 7 illustrates an example of an apparatus for operation mode adaptation in accordance with the methodology of FIG. 6.

In accordance with one or more aspects of the implementations described herein, FIG. 7 illustrates an example apparatus for operation mode adaptation in accordance with the methodology of FIG. 6. The exemplary apparatus 700 may be configured as a computing device or as a processor or similar device/component for use within. In one example, the apparatus 700 may include functional blocks that can represent functions implemented by a processor, software, or combination thereof (e.g., firmware). In another example, the apparatus 300 may be a system on a chip (SoC) or similar integrated circuit (IC).

In one implementation, apparatus 700 may include an electrical component or module 710 for determining channel conditions between the network entity and a second network entity.

The apparatus 700 may include an electrical component 720 for determining hardware constraints for the network entity.

The apparatus 700 may optionally include an electrical component 730 for determining power consumption requirements for the network entity.

The apparatus 700 may optionally include an electrical component 740 for balancing data throughput with power consumption for the network entity by selecting an operation mode, based at least in part on the channel conditions, the hardware constraints, and the power consumption requirements.

For the sake of conciseness, the rest of the details regarding apparatus 700 are not further elaborated on; however, it is to be understood that the remaining features and aspects of the apparatus 700 are substantially similar to those described above with respect to apparatus 500 of FIG. 5. Persons skilled in the art will appreciate that the functionalities of each component of apparatus 700 can be implemented in any suitable component of the system or combined in any suitable manner.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method of wireless communication operable by a network entity, comprising:
    determining a channel rank for channel conditions between the network entity and a second network entity, the channel rank being based on a number of data streams that can be supported by the channel;
    determining hardware constraints for the network entity;
    determining power consumption requirements for the network entity; and
    balancing data throughput with power consumption for the network entity by selecting a hardware allocation, based at least in part on the channel rank conditions, the hardware constraints, and the power consumption requirements.

2. The method of claim 1, further comprising wherein determining channel conditions by comprises determining a channel capacity for a channel between the network entity and the second network entity.

3. The method of claim 1, wherein determining the hardware constraints comprises determining a number of transmit antenna chains for the network entity.

4. The method of claim 1, wherein determining the hardware constraints comprises determining transmit antenna chain power amplifier capabilities.

5. The method of claim 1, wherein determining the power consumption constraints comprises determining a current battery level.

6. The method of claim 1, wherein selecting the hardware allocation comprises allocating unequal power levels to a plurality of transmit antenna chains, in response to determining that the plurality of transmit antenna chains have differing power amplifier capabilities.

7. The method of claim 1, wherein selecting the hardware allocation comprises disabling at least one transmit antenna chain.

8. The method of claim 7, wherein disabling the at least one transmit antenna chain is in response to determining a current battery level to be low.

9. The method of claim 7, further comprising periodically re-enabling a disabled transmit antenna chain for channel estimation or switching to a higher rank.

10. The method of claim 1, wherein selecting the hardware allocation comprises reallocating at least one transmit antenna chain from Wi-Fi use to Long Term Evolution (LTE) use or reallocating at least one transmit antenna chain from LTE use to Wi-Fi use.

11. The method of claim 1, wherein the network entity comprises an access terminal.

12. The method of claim 1, wherein the network entity comprises an access point.

13. A computer program product, comprising:
    a non-transitory computer-readable medium comprising:
        code for determining a channel rank for channel conditions between the network entity and a second network entity, the channel rank being based on a number of data streams that can be supported by the channel;
        code for determining hardware constraints for the network entity;
        code for determining power consumption requirements for the network entity; and
        code for balancing data throughput with power consumption for the network entity by selecting a hardware allocation, based at least in part on the channel rank conditions, the hardware constraints, and the power consumption requirements.

14. The computer program product of claim 13, wherein the code for determining the hardware constraints comprises code for determining transmit antenna chain power amplifier capabilities.

15. The computer program product of claim 13, wherein the code for selecting the hardware allocation comprises code for allocating unequal power levels to a plurality of transmit antenna chains, in response to determining that a plurality of transmit antenna chains have differing power amplifier capabilities.

16. The computer program product of claim 13, wherein the code for selecting the hardware allocation comprises code for disabling at least one transmit antenna chain.

17. A wireless communication apparatus, comprising:
means for determining a channel rank for channel conditions for a communication channel between the network entity and a second network entity, the channel rank being based on a number of data streams that can be supported by the channel;
means for determining hardware constraints for the network entity;
means for determining power consumption requirements for the network entity; and
means for balancing data throughput with power consumption for the network entity by selecting an operation mode, based at least in part on the channel rank conditions, the hardware constraints, and the power consumption requirements, wherein selecting the operation mode comprises (1) selecting one of a single-input single-output (SISO) mode, a single-input multiple-output (SIMO) mode, or a multiple-input multiple-output (MIMO) mode, and (2) selecting one of a carrier aggregation (CA) enabled mode or a CA disabled mode.

18. The apparatus of claim 17, further comprising wherein means for determining channel conditions comprises means for by determining a channel capacity for a channel between the network entity and the second network entity.

19. The apparatus of claim 17, wherein means for determining the hardware constraints comprises means for determining a number of transmit antenna chains for the network entity.

20. The apparatus of claim 17, wherein means for determining the hardware constraints comprises means for determining transmit antenna chain power amplifier capabilities.

21. The apparatus of claim 17, wherein means for determining the power consumption constraints comprises means for determining a current battery level.

22. The apparatus of claim 18, wherein means for selecting the operation mode comprises means for selecting the SISO mode and the CA enabled mode, in response to determining the channel capacity to be rank 1.

23. The apparatus of claim 17, wherein means for selecting the operation mode comprises means for selecting the MIMO mode in response to determining the channel capacity to be greater than rank 1.

24. The apparatus of claim 17, wherein means for selecting the operation mode is further based on means for determining a number of receive antenna chains for the second network entity.

25. The apparatus of claim 17, wherein means for selecting one of the SISO mode, the SIMO mode, or the MIMO mode is further based on means for determining a number of receive antenna chains for the second network entity.

26. A wireless communication apparatus, comprising:
at least one processor configured to:
determine a channel rank for channel conditions for a communication channel between the network entity and a second network entity, the channel rank being based on a number of data streams that can be supported by the communication channel;
determine hardware constraints for the network entity;
determine power consumption requirements for the network entity; and
balance data throughput with power consumption for the network entity in which an operation mode is selected based, at least in part, on the channel rank conditions, the hardware constraints, and the power consumption requirements, wherein the selection of the operation mode comprises (1) a selection of one of a single-input single-output (SISO) mode, a single-input multiple-output (SIMO) mode, or a multiple-input multiple-output (MIMO) mode, and (2) a selection of one of a carrier aggregation (CA) enabled mode or a CA disabled mode; and
a radio frequency (RF) transceiver capable of communicating with the second network entity.

27. The apparatus of claim 26, wherein the processor is configured to select the SISO mode and the carrier aggregation (CA) enabled mode in response to a determination that the channel capacity is rank 1.

* * * * *